US008836790B1

(12) United States Patent  
McMillan et al.

(10) Patent No.: US 8,836,790 B1
(45) Date of Patent: Sep. 16, 2014

(54) REMOTE MONITORING SYSTEM FOR TANKS

(71) Applicant: Remote Monitoring Systems, LLC, Marietta, GA (US)

(72) Inventors: Ronald Neal McMillan, Houston, TX (US); Terry Mike McMillan, Marietta, GA (US); Roger Dale Simmons, Madison, GA (US); Erich Alan Simmons, Dublin, OH (US)

(73) Assignee: Remote Monitoring Systems, LLC, Marietta, GA (US)

( * ) Notice: Subject to any disclaimer, the term of this patent is extended or adjusted under 35 U.S.C. 154(b) by 0 days.

(21) Appl. No.: 13/919,902

(22) Filed: Jun. 17, 2013

Related U.S. Application Data

(60) Provisional application No. 61/821,285, filed on May 9, 2013.

(51) Int. Cl.
    H04N 9/47     (2006.01)
    H04N 7/18     (2006.01)
(52) U.S. Cl.
    CPC .................................... *H04N 7/188* (2013.01)
    USPC .......................................... 348/156; 348/143

(58) Field of Classification Search
    None
    See application file for complete search history.

(56) References Cited

U.S. PATENT DOCUMENTS

| | | | | |
|---|---|---|---|---|
| 6,568,424 | B1* | 5/2003 | Galad et al. | 137/523 |
| 2007/0096872 | A1* | 5/2007 | Nguyen et al. | 340/5.61 |
| 2007/0289012 | A1* | 12/2007 | Baird | 726/17 |
| 2008/0128453 | A1* | 6/2008 | Burckholter et al. | 222/75 |
| 2008/0207171 | A1* | 8/2008 | van Willigenburg et al. | 455/411 |
| 2012/0075059 | A1* | 3/2012 | Fyke et al. | 340/5.21 |
| 2013/0233391 | A1* | 9/2013 | McMillan et al. | 137/1 |

* cited by examiner

Primary Examiner — Joseph Ustaris
Assistant Examiner — Kevin McInnish
(74) Attorney, Agent, or Firm — Elizabeth R. Hall

(57) ABSTRACT

An access and monitoring system that secures the operation of an actuator that opens or closes a valve to a storage vessel. The access and monitoring system has an on-site system having a valve, an actuator, a camera, a control panel with a keypad and signaling device, and a communication control unit that communicates with the valve actuator, the control panel and an off-site information processing unit. The on-site system communicates with the off-site information processing unit through a secure website residing on a server within the information processing unit. The access and monitoring system verifies and records the identity of all valve users that add samples to or remove samples from an on-site storage tank in a historical database.

12 Claims, 7 Drawing Sheets

| Remote Monitoring Systems | Home | Status | Reports | Setup | Logout (diamondback) |
|---|---|---|---|---|---|

Authorization Group for Valve 2032

| Enabled | Name | Security Code |
|---|---|---|
| ☑ | Abrian Pallanes | 460177 |
| ☑ | Billy Brookshire | 151797 |
| ☐ | Billy Kennedy | 168394 |
| ☑ | Chad Mitchell | 464758 |
| ☑ | Dispatch | 453157 |
| ☑ | Erich Simmons | 379280 |
| ☐ | Gabe Sanchez | 138549 |
| ☐ | Joe Merworth | 987201 |
| ☑ | Mike McMillan | 6705 |
| ☑ | Roger Haire | 135226 |
| ☑ | Roger Simmons | 6817 |
| ☐ | Roy Hernandez | 601033 |
| ☑ | Russel Prieskorn | 135464 |
| ☑ | Sal | 423157 |
| ☐ | Shane Barnett | 765828 |
| ☑ | Tommy Bostick | 464878 |
| ☑ | Wan Willson | 8687 |
| ☑ | Willie Stumberg | 135716 |

[ Save Group Members ]

Remote Monitoring Systems

| Home | Status | Reports | Setup | Logout |
|------|--------|---------|-------|--------|

Personnel Settings

| Name | Email | Cell Phone | Security Code | Account Active | SMS Paused |
|------|-------|------------|---------------|----------------|------------|
| Russel Prieskorn | | 4325565314 | 135464 | Yes | No |
| Roger Haire | | 4322697872 | 135226 | Yes | No |
| Willie Stumberg | | 4324886696 | 135716 | Yes | No |
| Billy Brookshire | | 4323012482 | 151797 | Yes | No |
| Tommy Bostick | | 4323013243 | 464878 | Yes | No |
| Dispatch | | 4328942003 | 453157 | Yes | No |
| Sal | | 4328942007 | 423157 | Yes | No |
| Chad Mitchell | | 4328138379 | 464758 | Yes | No |
| Abrian Pallanes | | 4323011027 | 460177 | Yes | No |
| Roy Hernandez | | 4323011158 | 601033 | Yes | No |
| Billy Kennedy | | 4324886910 | 168394 | Yes | No |
| Shane Barnett | | 4323013222 | 765828 | Yes | No |

[ Add a New Person ]

*FIG. 4*

| Remote Monitoring Systems | | | Home | Status | Reports | Setup | Logout (diamondback) |
|---|---|---|---|---|---|---|---|

Notification Groups                                                                                              Show Incactive

| Name | Send SMS | Send Email | Require Acknowledgement | Require Ack If Resolved | Resend Until Acknowledged | Resend Until Resolved |
|---|---|---|---|---|---|---|
| Windsor McClain Airport | Yes | No | Yes | No | 900 | 43200 |
| Windsor Rankin Tx | Yes | No | Yes | No | 900 | 43200 |
| Gardendale | Yes | No | Yes | No | 900 | 43200 |
| ST 36-8A | Yes | No | Yes | No | 900 | 43200 |
| RMS TESTING GROUP | Yes | No | Yes | No | 36000 | 43200 |
| ST W5 | Yes | No | Yes | No | 600 | 43200 |
| Neal 8-1H Battery | Yes | No | Yes | No | 120 | 43200 |
| BIG MAX 25-6 | Yes | No | Yes | No | 900 | 43200 |
| NULL GROUP | Yes | No | Yes | No | 180 | 43200 |
| JANIE 3-H | Yes | No | Yes | No | 600 | 43200 |
| ST 25 1-H | | | | | | |
| Neil 8 1-H Compressor | Yes | No | Yes | No | 600 | 43200 |
| UL 1-3 | Yes | No | Yes | No | 600 | 43200 |
| ERU-58-3-14 | Yes | No | Yes | No | 600 | 43200 |
| ST 25-2H | Yes | No | Yes | No | 600 | 43200 |
| ST 43 | Yes | No | Yes | No | 600 | 43200 |

Add A New Group

*FIG. 6*

Historical Database

| Valve ID | Time Location | Valve Stamp | Opened by & Status | Camera Icon |
|---|---|---|---|---|
| Ball Valve Demo | Demo Site | Jan 16th, 2012 9:52 AM | Opened | Opened By Mike McMillan |
| Ball Valve Demo | Demo Site | Jan 16th, 2012 9:50 AM | Locked | Opened By Blas Delgado |
| Ball Valve Demo | Demo Site | Jan 16th, 2012 9:50 AM | Unlocked | Opened By Mike McMillan 📷 |
| Ball Valve Demo | Demo Site | Jan 16th, 2012 9:50 AM | Opened | Opened By Blas Delgado |
| Ball Valve Demo | Demo Site | Jan 16th, 2012 9:48 AM | Locked | Opened By Blas Delgado |
| Ball Valve Demo | Demo Site | Jan 16th, 2012 9:48 AM | Unlocked | Opened By Blas Delgado |
| Ball Valve Demo | Demo Site | Jan 16th, 2012 9:47 AM | Opened | Opened By Blas Delgado |
| Actuator Demo | Demo Site | Jan 16th, 2012 9:47 AM | Locked | Opened By Blas Delgado |
| Ball Valve Demo | Demo Site | Jan 16th, 2012 9:43 AM | Unlocked | Opened By Blas Delgado 📷 |
| Actuator Demo | Demo Site | Jan 16th, 2012 9:41 AM | Opened | Opened By Blas Delgado |
| Actuator Demo | Demo Site | Jan 16th, 2012 9:38 AM | Unlocked | Opened By Blas Delgado 📷 |
| Actuator Demo | Demo Site | Jan 16th, 2012 9:08 AM | Locked | Opened By Mike McMillan |
| Actuator Demo | Demo Site | Jan 16th, 2012 9:07 AM | Opened | Opened By Mike McMillan |
| Actuator Demo | Demo Site | Jan 16th, 2012 9:03 AM | Unlocked | Opened By Mike McMillan 📷 |
| Secure Valve Demo | Demo Site | Jan 16th, 2012 8:49 AM | Locked | |
| Actuator Demo | Demo Site | Jan 16th, 2012 8:56 AM | Locked | Opened By Mike McMillan |
| Actuator Demo | Demo Site | Jan 16th, 2012 8:55 AM | Opened | Opened By Mike McMillan |
| Actuator Demo | Demo Site | Jan 16th, 2012 8:53 AM | Unlocked | Opened By Mike McMillan 📷 |

*FIG. 7*

REMOTE MONITORING SYSTEM FOR TANKS

STATEMENT OF RELATED APPLICATIONS

This application claims the benefit of U.S. Provisional Application No. 61/821,825 filed May 9, 2013 and entitled "Remote Monitoring Systems for Tanks."

BACKGROUND OF THE INVENTION

1. Field of the Invention

This invention relates to the field of remotely monitoring the access to valves governing the flow of fluid into and out of a storage tank. The monitoring system verifies the identity of a person requesting to open a valve that governs fluid flow into or out of the storage tank and permits authorized personnel to add fluid to or remove fluid from a remote storage vessel.

2. Description of the Related Art

An oil well produces a mixture of oil, water, and gas. The mixture is pumped from the well through a pipe into a separator unit that is near the well site. At the separator unit (often referred to as a "gun barrel"), the oil, water, and gas from the well are separated. The separated oil and water each flow through a separate network of piping to designated oil or water storage tanks. The separated gas flows through a separate piping network connected to a commercial pipeline and is ultimately sent to market. If no commercial pipeline is in place to handle the gas, it is either flared (burned at the site) or vented into the air. The separation and storage of the oil and water typically take place at what is known in the industry as tank battery sites or tank batteries.

Most crude oil is moved to refineries by truck, since most oil production and the associated tank battery sites are in remote areas where pipelines are often not accessible. In order for a tanker truck to remove the oil from a tank at a tank battery site, the truck pulls up adjacent to a pipe coming out of a crude oil tank, hooks up a flexible hose to the pipe, opens the mechanical valve that controls the flow of oil from the pipe to the truck, and removes the oil from the storage tank.

Most tank battery sites are in remote areas and are typically unprotected. Since there is little or no security around the tanks, a significant amount of theft has occurred at these sites. Today a typical tanker truck holds approximately 170 barrels of oil with a value of over $16,000.

Typically, tank battery sites are unattended and are not in locked enclosures. In fact, the transfer valves used to take oil from the storage tanks are not locked or if they are, it is a simple mechanical padlock that can easily be cut off. Thus, thieves often steal the oil by simply attaching a hose to as tank truck and opening a mechanical valve. The thieves generally deliver the stolen oil to an accomplice's storage tank located in the same vicinity and split the profit from the sale of the oil.

A need exists for a more secure system of oil removal thereby hindering, if not completely preventing, the theft of the oil at these remote storage sites. Although preventing the theft of oil is described above, there is also an ongoing need to prevent the theft of natural gas from pipelines or gas storage sites.

SUMMARY OF THE INVENTION

One embodiment of the present invention is a remote access and monitoring system having: (a) a valve having an open position and a closed position, wherein the open position permits a fluid to flow into or out of a storage vessel and the closed position prevents flow into or out of the storage vessel; (b) an actuator for moving the valve to the open position or the closed position; (c) a camera; (d) a control panel having an input device, as valve open signaling device in communication with the camera and a valve close signaling device; (e) an on-site communication control unit in communication with the control panel and the actuator; and (f) an information processing unit remote from the onsite communication control unit having an installed personnel list, a list of authorized personnel for activating the actuator, and a historical database of all actuator activity, wherein the information processing unit is in communication with the on-site communication control unit through a secure internet site.

A second embodiment of the present invention is an access and monitoring system for a storage vessel having: (a) a valve having an open position and a closed position, wherein the open position permits a fluid to flow into or out of the storage vessel and the closed position prevents flow into or out of the storage vessel; (b) an actuator for moving the valve to the open position or the closed position; (c) a strobe light that is activated whenever the actuator moves the valve to the open position and is inactivated whenever the actuator moves the valve to the closed position; (d) a camera; (e) a control panel having an input device with a keypad and a screen, a valve open signaling device that inactivates the camera to photograph a valve user, and a valve close signaling device that inactivates the camera; (f) an on-site communication control unit in communication with the control panel and the actuator, the on-site communication control unit includes a first computer and an internet communication device; and (g) an information processing unit remote from the on-site communication control unit having a second computer and a server, wherein the information processing unit communicates with the on-site communication control unit through a secure website residing on the second server.

Another embodiment of the present invention is a process for controlling the removal of fluid from a tank battery site, the process including the steps: (a) connecting a fluid transport truck hose to a first end of a pipe, wherein the opposed second end of the pipe is connected to a fluid storage tank at the tank battery site and wherein fluid flow through the pipe is controlled by an actuated valve having an open position that permits fluid flow from the storage tank to the fluid transport truck and a closed position that prevents fluid flow out of the storage tank; (b) entering a valve user identifier into an valve control system that communicates information between a communication control unit at the tank battery site and an information processing unit remote from the tank battery site through a secure internet site; (c) entering a valve identification number into the valve control system; (d) verifying that the valve user identifier is listed in association with an authorized user; (e) signaling the authorized user to activate a valve open signaling device that activates an actuator to open the valve, a camera to photograph the authorized user, and a strobe light to alert tank battery site personnel that the valve is opened; (f) recording a time when the valve was opened, the valve user identifier, and the photograph of the authorized user in the valve control system; (g) notifying a person designated on a notification list whenever the valve is opened; (h) activating a valve close signaling device to activate the actuator to close the valve, deactivate the camera, deactivate the strobe light, and record a time when the valve was closed; (i) notifying the person designated on the notification list whenever the valve is closed; and (j) disconnecting the fluid transport truck hose from the first end of the pipe.

Yet another embodiment of the present invention is a process for controlling and monitoring a valve including the steps: (a) installing an access and monitoring system at a storage vessel site, the system including (i) a valve having an open position and a closed position, wherein the open position permits a fluid to flow into or out of the storage vessel and the closed position prevents flow into or out of the storage vessel, (ii) an actuator for moving the valve to the open position or the closed position, (iii) a camera, (iv) a strobe light, (v) a control panel having an input device, a valve open signaling device in communication with the camera, and a valve close signaling device; (vi) an on-site communication control unit in communication with the control panel and the actuator, and (vii) an information processing unit remote from the on-site communication control unit having an installed personnel list, a list of authorized personnel for activating the actuator, and a historical database of all actuator activity, wherein the information processing unit is in communication with the on-site communication control unit through a secure internet site; (b) entering a valve user identifier into the access and monitoring system; (c) checking the list of authorized personnel to verify that the valve user identifier is associated with an authorized user; (d) communicating the authorization of the valve user to the control panel; (e) signaling the authorized valve user to activate the valve open signaling device to activate the actuator to open the valve, the camera to photograph the valve user, and the strobe light to alert tank battery site personnel that the valve is opened; (f) recording a time when the valve is opened, the valve user identifier used to authorize the valve user, and the photograph of the valve user in the access and monitoring system; (g) notifying a person designated on a notification list each time the valve is opened; (h) activating at valve close signaling device to activate the actuator to close the valve, deactivate the camera, deactivate the strobe light, and record a time when the valve is closed; and (i) notifying the person designated on the notification list of each time the valve is closed.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is an illustration of the information in one embodiment of a Personnel List database.

FIG. 6 is an illustration of the information in one embodiment of a Notification Group database.

FIG. 7 is an illustration of the information in one embodiment of a Historical Database.

DESCRIPTION OF THE PREFERRED EMBODIMENTS

The remote access and monitoring system described herein relates to the field of remotely monitoring the access to valves governing the flow of fluid or gas into and out of a storage tank. Embodiments of the present invention include a system for securing the operation of an actuator that opens or closes a remote valve that governs fluid flow into and out of a remote storage vessel and for recording all opening and closing of the valve.

One embodiment of the system includes an on-site system having a valve, an actuator, a camera, a control panel with a keypad and signaling device, and a communication control unit that communicates with the valve actuator, the control panel and an off-site information processing unit. The on-site system communicates with the off-site information processing unit through a secure website residing on a server within the information processing unit. The access and monitoring system verifies and records the identity of all valve users that add samples to or remove samples from an on-site storage tank in a historical database. Such samples may be liquid or gas.

Figure 1:
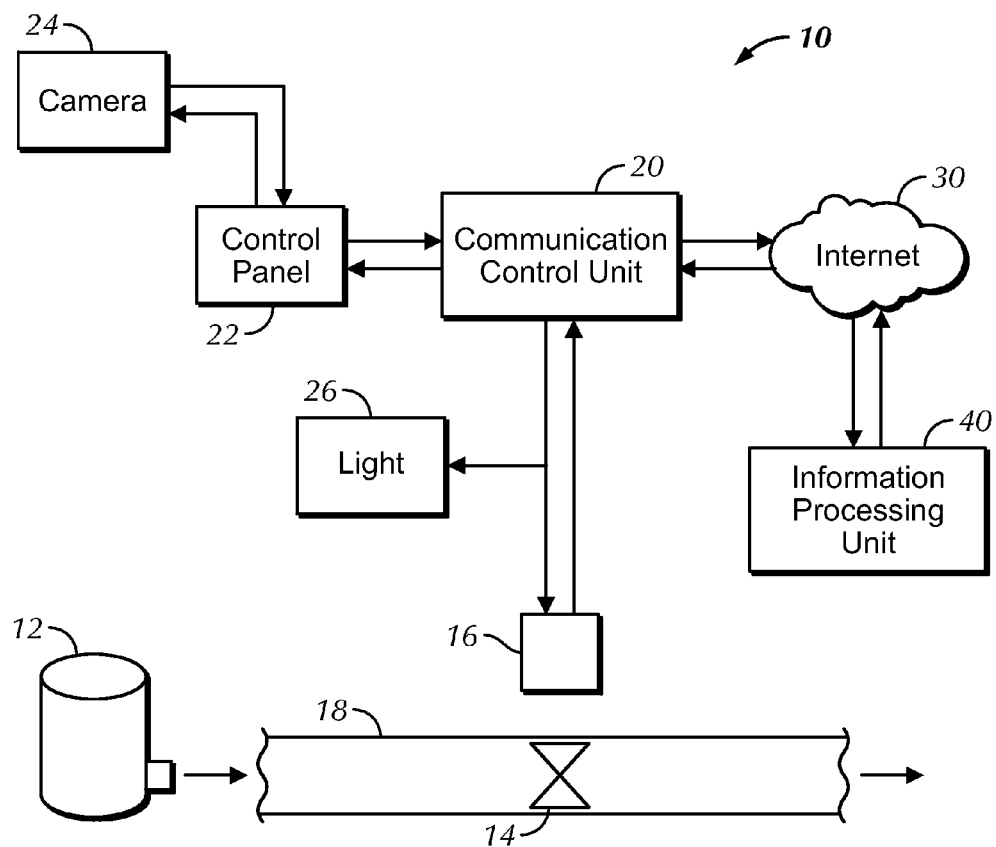
FIG. 1 is a general schematic of a system for securing the operation of an actuator that opens or closes a remote valve that governs the flow of fluid or gas into and out of a remote storage vessel and for recording all opening and closing of the valve.

A preferred embodiment of the system, illustrated in FIG. 1, includes: (a) as valve 14 having an open position and a closed position, wherein the open position permits a fluid to flow into or out of a storage vessel 12 and the closed position prevents flow into or out of the storage vessel 12; (b) an actuator 16 for moving the valve to the open position or the closed position; (c) a camera 24; (d) a control panel 22 having a key pad and a lighted indicator device in communication with the camera 24; (e) an on-site communication control unit 20 that communicates with the control panel 22 and the actuator 16; and (f) an information processing unit 40 remote from the onsite communication control unit having an installed personnel list, a list of authorized personnel for activating the actuator, and a historical database of all actuator activity, wherein the information processing unit is in communication with the on-site communication control unit through a secure internet site 30.

The remote access and monitoring system 10 is suitable for securing the access to valves at unattended remote tank battery sites. For example, tank battery sites often have storage tanks 12 of oil that are fitted with a hose or pipe 18 having a transfer valve 14. When a tank truck arrives at the site to remove a load of crude oil, the truck pulls up adjacent to the pipe, hooks up a flexible hose to the pipe 18, opens the transfer valve 14 permitting the flow of oil from the storage tank 12 to the truck. The remote access and monitoring system 10 is also suitable for securing the access to an unattended valve at a gas storage site or at a gas pipeline.

On-Site Valve Access and Monitoring

The remote access and monitoring system 10 uses an on-site valve 14, actuator 16, camera 24, strobe light 26, and control panel 22. The on-site system is coordinated and controlled by the communication control unit 20 described below.

The valve 14 is secured such that it can only be opened and closed by an actuator 16. When the valve 14 is in an open position, fluid flows through the pipe 18 between the storage tank 12 and a tank truck, pipeline, or other fluid reservoir and when the valve 14 is closed the fluid is not permitted to flow through the pipe 18. The valve 14 is typically a ball valve or a butterfly valve and the actuator 16 is generally an electric motor designed to open and close the valve 14.

The system 10 optionally includes a strobe light 26 that is automatically turned on whenever the actuator 16 opens the valve 14. The activation of the strobe light 26 will alert anyone close by or on the site that a valve is open. Similarly, the strobe light is automatically shut off whenever the actuator 16 closes the valve 14.

The system 10 also includes a camera 24 that is automatically activated whenever a command to open the valve is received. Thus, as a valve user pushes an actuator "open" signaling device 36, the camera 24 takes a photo of the person activating the "open" signaling device, as well as a panoramic photo of the area in the general proximity of the valve 14. The camera 24 is preferably an infrared pan/tilt/zoom digital camera that automatically records all photos taken.

Figure 2:
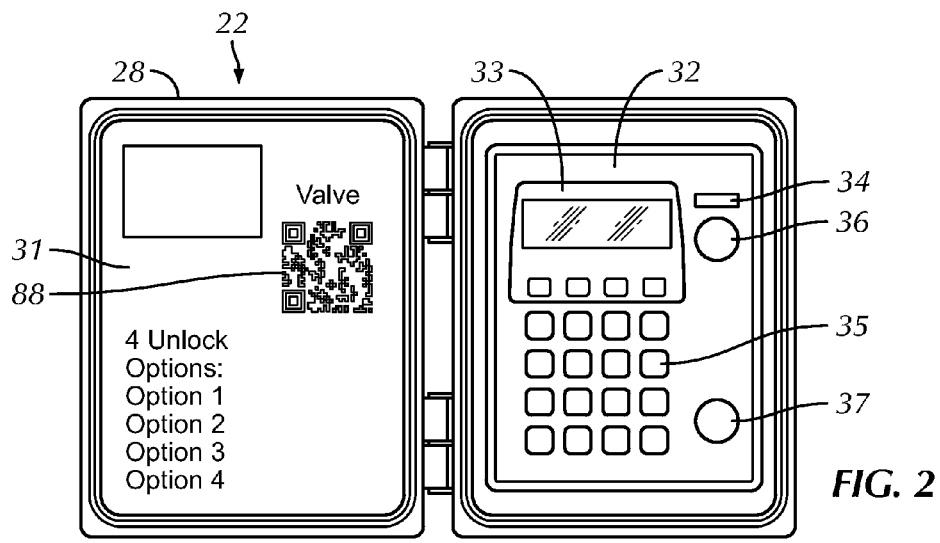
FIG. 2 is a frontal view of the control panel for the system shown in FIG. 1.

An on-site control panel 22 contains control relays and communication hardware. One embodiment of the control panel 22 has input devices such as a keypad 32 and an open signaling device 36 and a shut signaling device 37 mounted in a housing with a hinged lid 38. Clearly mounted on the inside of the lid 38 are instructions 31 on how to open and shut the valve. The keypad 32 may be a touch screen keypad or the keypad 32 may have both a screen 33 and keys 35 for entering numbers, symbols or letters, such as shown in FIG. 2. Adjacent the keypad is an open indicator light 34 and/or the open signaling device 36, as well as the close signaling device 37. In some embodiments, the indicator light 34 and the open signaling device 36 are integrated. For example, the open signaling device 36 may be a clear elastomeric button having an indicator light 34 beneath it so that when the indicator light comes on the button is lit to indicate that the user must push it to activate the valve actuator 16 to open the valve 14.

A valve owner may have one or more valves at any particular site. If there is more than one valve located at a site, each valve is clearly labeled with a valve identification number and each valve is assigned a specific valve open signaling device and a specific valve close signaling device.

On-Site Communication Control Unit

The on-site communication control unit (CCU) 20 is the communication hub of system 10 and orchestrates the activation, deactivation, cooperation of the various components of the system.

Figure 3:
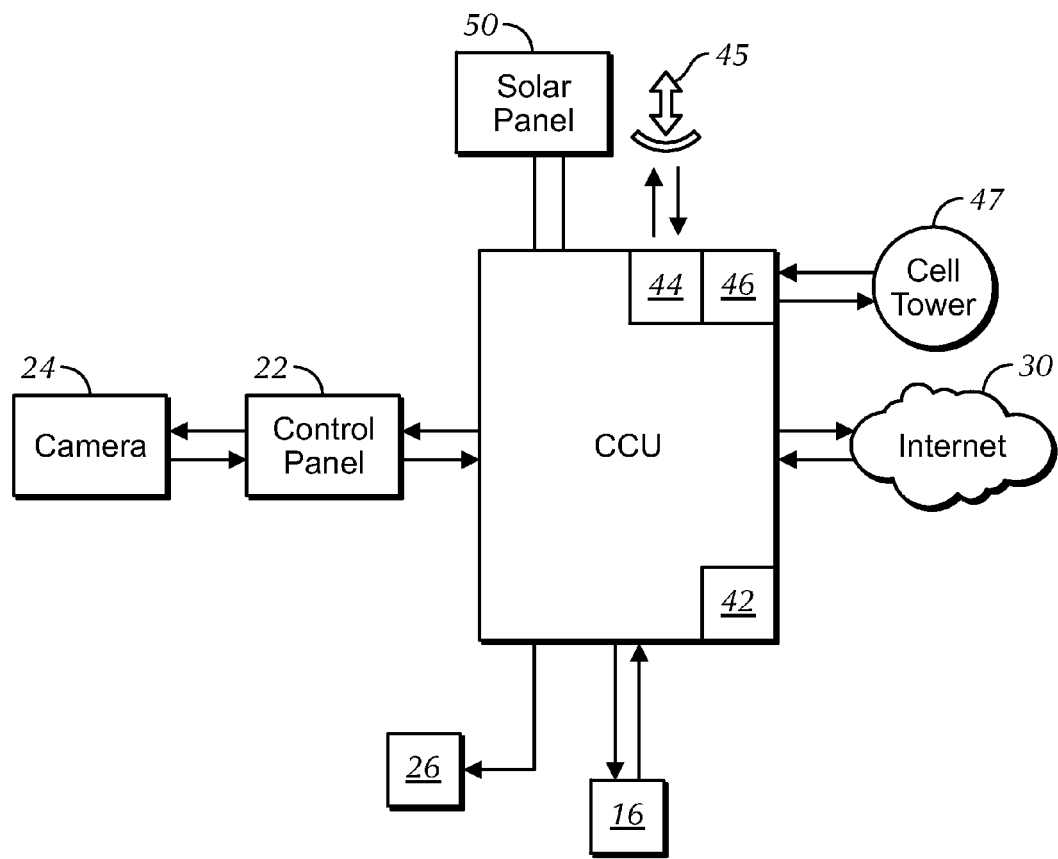
FIG. 3 is a schematic of the on-site communication control unit of the system shown in FIG. 1.

The on-site CCU, shown in FIG. 3, includes diversified communications equipment allowing the on-site CCU 20 to communicate with the actuator 16, a control panel 22, the light 26, the camera 24, and a secure off-site information processing unit (IPU) 40 via the internet 30. The on-site communication control unit 20 includes a computer, a router and one or more communication devices for connecting to the internet. The software installed on the computer of the CCU 20 processes data entered from the keypad 32 at the control panel 22, connects to and communicates with the off-site IPU 40, receives data and instruction back from the off-site IPU 40, and communicates those instructions to the actuator 16, the control panel 22, the strobe light 26, and the camera 24.

The communication control unit 20 typically includes at least one of the following communication devices: a modem 42 to allow the system to communicate via a "landline" internet connection (e.g., DSL or cable modem), a satellite antenna 44 to communicate via low orbit satellite 45 (e.g., Iridium, etc.) or geosynchronous satellite 45 (e.g., Hughes-.Net, etc.), and/or a cellular antenna 46 to communicate via a cellular communication tower data connection 47. The CCU 20 is designed to establish and maintain communications with an information control unit 40 that verifies the authorization of the valve user and allows authorized valve users to activate the valve actuator 16 in conjunction with the strobe light 26 and the camera 24.

Off-Site Information Processing Unit

The off-site information processing unit (IPU) 40 typically includes a computer, a server, a router and one or more communication devices for connecting to the internet. The web based software integral to system operations is designed to establish and maintain communications between the communication control unit 20 and the information processing unit 40. For example, a secure website resides on the server of the ICU 40 that communicates with the software installed on CCU 20 and the software on the server and/or the computer of the IPU 40. The information processing unit 40 is the communication center that works through the communication control unit 20 to orchestrate the activation, deactivation, and cooperation of the various on-site and off-site components of the system 10.

The information processing unit (IPU) 40 has several lists or databases created by the owner of the valve and stored on the server of the IPU 40. These lists include as personnel list, a list of authorized personnel for operating a particular valve, and a list of personnel to be notified under certain circumstances.

Typically, a first step required by the software is the creation of a "Personnel List" which is a list of the cell phone numbers of those who are authorized to open/close a valve. The Personnel List also includes a random computer assigned security code that can be used on-site to operate a valve. An example, of a Personnel List is shown in FIG. 4. The Personnel List is maintained on the remote server that is part of the IPU 40 and accessed via an internet connection over the DSL, satellite, or cell phone connection.

The list of names and cell phone numbers on the Personnel List serves as a reference list for at least two other lists or databases created by the valve owners that is stored on the server within the information processing unit (i.e., the "Authorization Group" and the "Notification Group"). The valve owner and/or any authorized administrator of the website can add or delete names and phone numbers to the Personnel List.

Figure 5:
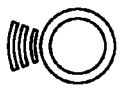
FIG. 5 is an illustration of the information in one embodiment of an Authorization Group database.

The Authorization Group (as shown in FIG. 5) designates which individuals on the Personnel List are authorized by the valve owner to open or close any individual valve (valves are numbered by location). By clicking on the "Enabled" box, the valve owner can give an individual access or deny access to a particular valve at a given site. The Authorization Group designates each person on the Personnel List that is authorized to open or close a particular valve, as well as any restrictions (time of day, day of week, etc.) that may apply. The Authorization Group also includes the random computer assigned security code that can be used on-site to operate the valve.

The owner of the valve may also create a Notification Group (illustrated in FIG. 6). The Notification Group is a list of names from the Personnel List designating which individuals are to be notified when a valve is opened or closed. The software allows each individual in the Notification Group to be notified either with cellular telephone text messages (indicated as a 'yes' or 'no' entry in the "Send SMS" column) or by e-mails (indicated as a 'yes' or 'no'0 entry in the "Send E-mail" column). Furthermore, the owner may require that any person notified whenever a valve is opened or closed actually acknowledge receipt of the notification (indicated as a 'yes' or 'no' in the "Require Acknowledgement" column).

In addition, the software has the capability to send progressive alerts based on the valve owner or the valve administrator's preference as to who is to be notified first, second, third and so forth. The valve owner can also set the number of seconds that elapse before the next progressive alert notification is sent ("Resend Until Acknowledged" column) and how long (in seconds) the progressive alerts will be sent ("Resend Until Resolved" column).

Monitoring Valve Access

Whenever a valve user requests clearance to open or close a specified valve, the Authorization Group is checked to ensure that the person making the request is indeed authorized to activate the actuator 16 to open or close that specific valve 14. Once the authorization of the person has been verified, an open indicator light 34 lights up and the person has a specific set time period (e.g., 20 seconds) to activate the open signal device 36 (e.g., push a button next to the open indicator light 34).

Once the authorized valve user activates the open signal device 36, the communication control unit 20 activates the actuator 16, the light 26 to illuminate the area around the valve, and the camera 24 to take a picture of the valve user and the general area around the valve (e.g., a truck loading oil from a storage tank). All photos are recorded in an on-site database in an industrial grade computer in the communication control unit 20, plus a copy of the photos are sent to the server off-site information processing unit 40 to be stored in a valve activity Historical Database that can be accessed by the owner of the valve.

The information processing unit server 40 also records the name of the person who opened the valve (by cross referencing the access code entered to open the valve to the one assigned to each person listed in the Authorization Group), records the time the valve was open and closed, and stores all the information with the corresponding photo of the person who opened the valve in the server's database. The Historical Database is accessible at anytime from a computer or "smart phone." FIG. 7 illustrates one embodiment of a Historical Database recording the activation of a specified valve. Typically, the Historical Database is maintained by valve and location as set up by the valve users and/or website administrators.

To close the valve, the user needs only to press the close signaling device 37 on the control panel 22 and the valve 14 will immediately close. Once the valve 14 is closed the strobe light 26 goes off and the historical database is updated.

Operation of the Remote Access and Monitoring System

The remote access and monitoring system 10 is designed to minimize the administrative burden for the owners of the valves used at oil field tank batteries, a gas pipeline or other sites where it may be advantageous and efficient to secure and remotely control valves. The system 10 can be configured in a variety of ways to limit who can open and close an individual designated actuator valve, and even under what circumstances the valve may be opened or closed (time of day, day of week, etc.). Several examples of how the valve can be opened and closed by a remote operator or an on-site valve user are described in more detail below. Detailed step-by-step instructions 31 on how to open and close the valve 14 are generally posted on the inside of the hinged lid 38 to the control panel housing.

First Option. Probably the most direct way in which an on-site valve user can open the valve is to enter his user security code followed by the # key on the keypad 32 of the control panel 22. The user security code is assigned by the system software and recorded in the Personnel List and the Authorization Group database.

An industrial grade mini-computer (e.g. Raspberry Pi, etc.) in the communication control unit (CCU) 20 records the user security code and passes the information to the router and the modem that are also in the CCU 20. The modem in the CCU 20 will then establish communications via an Ethernet data connection to the remote information processing unit 40 via a DSL, cell phone, or satellite.

Once the communications path is established with the remote server at the IPU 40, the system software on the server will verify whether the entered security code matches a security code on the Personnel List and in the Authorization Group database. If there is a match, the remote server will communicate through the established Ethernet data connection with the mini-computer in the communication control unit 20 at the remote valve site that access to open the valve 14 is granted. The software running on the mini-computer at the CCU 20 will then cause the display on the screen 33 of the control panel 22 to prompt the user to enter the valve identification number on the keypad 32.

Once the valve identification number is entered followed by the # key, an open indicator light 34 on the control panel 22 next to the keypad 32 will begin to glow and a message on the keypad screen 33 will prompt the user to activate the open signaling device 36 within a specified time period. For example, the open signaling device may be a button or a switch that the user has 20 seconds to activate in order to open the valve 14. A preferred embodiment of the open signaling device 36 is a green control button on the control panel 22. Activating the open signaling device causes a relay to be energized in the communication control unit 20 to provide power to the actuator 16 and cause the valve 14 to open.

Simultaneously, when the relay in the CCU 20 closes, power is connected to the strobe light 26 causing it to start flashing. At the same time, the pan/tilt/zoom camera 24 is powered up and the software running on the mini-computer in the CCU 20 causes the camera to begin taking photos that are transmitted via the hard wiring back to the mini-computer. The software in the mini-computer temporarily stores the photos in its solid-state storage until the photos are transmitted via the Ethernet connection using the DSL, satellite, or cellular router/modem to transmit the photos to the off-site server at the IPU 40. Typically, each CCU 20 is equipped with several transmitters/receivers such as a satellite and/or a cellular antenna.

The software running on the off-site server records the user photo, along with the name (e.g., a trucker) of the valve user who initiated the activation of the valve 14. The photos correlated to the user name are time stamped and recorded in the Historical Database as depicted in FIG. 7. The server software also simultaneously accesses the Notification Group in the software running on the off-site server database to determine who is to be notified based on the valve owner's previously provided list. The server then sends e-mails or text messages to those cell phone numbers or e-mail addresses as designated in the Notification Group.

To close the valve 14, the valve user simply activates the close signaling device 37 (e.g., pressing a red button) on the control panel 22. Activating the close signaling device 37 causes a relay in the CCU 20 to once again power the actuator 16 causing the valve 14 to close. As soon as the relay contacts in the CCU 20 open, power is disconnected from the strobe light 26 causing it to stop flashing. At the same time, the power is disconnected to camera 24 and it discontinues taking photos.

The software running on the off-site server then records the time when the valve 14 closes in the Historical Database and again sends e-mails or text messages to the designated Notification Group maintained on the server notifying them that the valve has been closed.

Second Option: An on-site valve user can also use his "smart phone" to open the valve; provided that his cell phone number is registered with the owner of the valve and in entered in association with his name and security code on the Personnel List and the Authorization List. If the user's smart phone has a Quick Response (QR) scanner application on it, the user can use his phone to scan the QR code 38 posted on the control panel 22 to access the valve.

The computer in the communication control unit 20 will record the QR code scan and communicate the scan to the router and modem in the CCU 20 to be passed on to the off-site server. Thus, generally speaking once the user has scanned the QR code, the user is automatically connected to a secure web site stored on the Information Processing Unit 40. At that point the user will be prompted to hit the "send" button on his smart phone and then enter the valve number to be opened on his phone keyboard.

The system will then activate the open indicator light 34 and/or the open signaling device 36 on the nearby control panel 22. The user can then open the valve 14 by activating the open signaling device 36. From that point, the sequence of events in opening and closing the valve is the same as detailed above in the first option. With each opening or closing of the valve, the Notification Group is notified and the Historical Database is updated with information on who opened the valve, the time when the valve was opened, the time when the valve was closed, and the associated photographs from the site.

Third Option. An on-site valve user can also call a valve access number, which is connected to the remote server on the information processing unit 40. The software on the server will answer the call and check the Authorization Group database for the security code and name associated with the cell phone number on the Personnel List. Upon verification that the calling cell phone number matches one on the Personnel List and that the individual identified with that cell phone number is included in the Authorization Group, the user will be prompted to enter the valve identification number on his cell phone keyboard. Once the valve identification number is entered, the software will prompt the user to activate the open signaling device 36 on the control panel 22 to open the valve 14.

From that point, the sequence of events in opening and closing the valve is the same as detailed above in the first option. With each opening or closing of the valve, the Notification Group is notified and the Historical Database is updated with information on who opened the valve, the time when the valve was opened, the time when the valve was closed, and the associated photographs from the site.

Fourth Option. Similarly, an on-site valve user can use his cell phone to send a text message to the telephone number shown on the signage at the site to start the valve opening sequence. The user enters the posted telephone number on his phone and pushes "send." The user will then be prompted to send a reply message that says "Lock/unlock valve #." This message, including the proper valve identification number, will automatically appear on the user's cell phone screen as part of the prompt.

When the user pushes "send" on his phone, the message will be sent. At this point the user will receive a message back prompting him to activate the open signaling device 36 on the control panel 22. The valve 14 opens as soon as the user activates the open signaling device 36.

From that point, the sequence of events in opening and closing the valve is the same as detailed above in the first option. With each opening or closing of the valve, the Notification Group is notified and the Historical Database is updated with information on who opened the valve, the time when the valve was opened, the time when the valve was closed, and the associated photographs from the site.

Fifth Option. The owner of the valve to be opened can also open and/or close the valve 14 from a remote location such as an operations center. If this option is chosen, the user would be directed by signage at the site to call a telephone number for access. The operator at the remote location would then verify the identity of the person seeking to open the valve by cross-referencing the person's name, security code, or other information with the information registered on the Personnel List and in the Authorization Group as authorized to open the valve 14. The operator at the remote location can also activate the camera 24 at the site to view the person seeking valve access.

Figure 8:
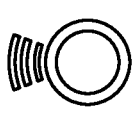
FIG. 8 is an illustration of the information in one embodiment of a valve status database for a specific valve.

If the remote operator is satisfied that the person seeking access should be authorized to open the valve, the operator will access the system software Secure Valve Status screen seen in FIG. 8. The remote operator will then click on "Locked-Unlocked" corresponding to the appropriate valve under the "Status" column to initiate the valve opening sequence and tell the person at the site to activate the open signaling device 36 on the control panel 22. As soon as the user activates the open signaling device 36, the valve 14 is opened.

From that point, the sequence of events in opening and closing the valve is the same as detailed above in the first option. With each opening or closing of the valve, the Historical Database is updated with information on who opened the valve, the time when the valve was opened, the time when the valve was closed, and the associated photographs from the site. The remote operator may also initiate the notification of the people on the Notification Group.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. For example, the phrase "a valve" should be read to describe one or more valves. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention.

It should be understood from the foregoing description that various modifications and changes may be made in the preferred embodiments of the present invention without departing from its true spirit. The foregoing description is provided for the purpose of illustration only and should not be construed in a limiting sense. Only the language of the following claims should limit the scope of this invention.

What is claimed is:

1. A computer-implemented process for controlling and monitoring a valve including:
   (a) establishing a communication path between a valve control system at a valve site and a remote information processing unit through a secure internet site;
   (b) actuating the valve from a closed state to an open state in response to communication received by the valve control system from the remote information processing unit, wherein actuating the valve to the open state comprises:
      (i) entering a valve user security code and a valve identification number into the valve control system;
      (ii) matching the entered valve user security code and valve identification number with an authorized user on an authorized user list residing on the remote information processing unit;
      (iii) signaling, upon receipt of a match notification from the remote information processing unit, the authorized user to activate a valve open signaling device within a specified time period; and
      (iv) activating the valve open signaling device to automatically activate:
         (i) an actuator associated with the valve, and
         (ii) a camera to photograph the authorized user; and
   (c) updating the remote information processing unit, through the established communication path, with a record of a time when the valve was opened, the name of the authorized user, and a photograph of the authorized user into a historical database of all actuator activity residing on the remote information processing unit.

2. The process for controlling and monitoring a valve of claim 1, further comprising activating a valve close signaling device associated with the valve,
   wherein activating the valve close signaling device activates the actuator to move the valve to the closed state,
   wherein the step of moving the valve to the open state causes the activation of a light, and
   wherein the step of moving the valve to the closed state inactivates the light.

3. The process for controlling and monitoring a valve of claim 2, wherein the remote information processing unit further performs the steps of:
   (i) allowing one or more persons designated on a notification list to be notified whenever the valve is moved to the open state; and
   (i) allowing the one or more persons designated on the notification list to be notified whenever the valve is moved to the closed state.

4. The process for controlling and monitoring a valve of claim 1, wherein the valve control system includes a computer, a router, and an internet communication device.

5. The process for controlling and monitoring a valve of claim 1, wherein the valve control system includes a modem, a satellite antenna, or a cellular antenna.

6. The process for controlling and monitoring a valve of claim 1, further comprising activating a valve close signaling device associated with the valve,
   wherein the valve close signaling device is in communication with the camera, and
   wherein activating the valve close signaling device deactivates the camera.

7. A computer-implemented process for controlling and monitoring a valve, the process including the steps:
   (a) establishing a communication path between a valve control system at a valve site and a remote information processing unit through a secure internet site;
   (b) entering a valve user identifier into the valve control system;
   (c) entering a valve identification number into the valve control system;
   (d) transmitting the valve user identifier and the valve identification number to the remote information processing unit through the established communication path for matching, in the remote information processing unit, the valve user identifier with an authorized user listed on an authorized user list for the entered valve identification number;
   (e) prompting, upon receipt of a match notification from the remote information processing unit, the authorized user to activate a valve open signaling device within a specific time period, wherein upon its activation, the valve open signaling device automatically activates:
      (i) an actuator to open the valve from a closed state to an open state,
      (ii) a camera to photograph the authorized user, and
      (iii) a light to alert valve site personnel that the valve is opened;
   (f) recording a time when the valve was opened, the valve user identifier, and the photograph of the authorized user in the valve control system;
   (g) providing notification to one or more persons designated on a notification list whenever the valve is opened;
   (h) activating a valve close signaling device to automatically:
      (i) activate the actuator to move the valve to a closed state,
      (ii) deactivate the camera,
      (iii) deactivate the light, and
      (iv) record a time when the valve was closed; and
   (i) providing notification to the one or more persons designated on the notification list whenever the valve is closed.

8. The process for controlling and monitoring a valve of claim 7, wherein the valve user identifier is a cellular phone number or a random computer generated security code.

9. The process for controlling and monitoring a valve of claim 7, further comprising the step of maintaining a historical database on the remote information processing unit by recording:
   (a) a date, hour and minute that the valve is opened or closed;
   (b) a name and valve user identifier of the authorized user that activates the valve open signaling device and the valve close signaling device; and
   (c) the photograph of the authorized user that activates the valve open signaling device.

10. A computer-implemented process for remotely controlling and monitoring a valve at a storage vessel site comprising:
   (A) establishing a communication path between an on-site valve control system and a remote information processing unit, wherein the valve control system comprises:
      (i) a valve open signaling device configured to permit a fluid to flow into or out of the storage vessel; and
      (ii) a valve close signaling device configured to prevent the fluid from flowing into or out of the storage vessel;
   (B) receiving, through the on-site valve control system, a request from a user for accessing the valve, wherein the request comprises a valve identification number associated with the valve and a valve user security code assigned to the user, and transmitting the request to the remote information processing unit through the established communication path;

(C) matching, in the remote information processing unit, the transmitted valve user security code and valve identification number with an authorized user on an authorized user list residing on the remote information processing unit to ensure valve accessing authorization is provided only if the user is authorized to access the valve;

(D) communicating the valve accessing authorization through the established communication path to the on-site valve control system, wherein communicating the valve accessing authorization comprises signaling the user to activate the valve open signaling device within a defined time period;

(E) activating the valve open signaling device within the defined time period to automatically activate a valve actuator associated with the valve such that the valve is moved into an open state;

(F) automatically activating a camera to photograph the authorized user, wherein the photograph of the authorized user is transmitted from the valve control system to the remote information processing unit;

(G) updating the remote information processing unit with a record of a time when the valve was opened, the name of the authorized user, and a photograph of the authorized user into a historical database of the valve actuator activity residing on the remote information processing unit; and (H) activating the valve close signaling device to automatically activate the actuator to move the valve to a closed state, deactivate the camera, and record a time when the valve was closed.

11. The process for controlling and monitoring a valve of claim 10, wherein the remote information processing unit is configured to correlate the transmitted photograph of the authorized user with the name of the authorized user.

12. The process for controlling and monitoring a valve of claim 10, wherein the camera that photographs the authorized user takes both a close-up photograph of the authorized user activating the valve open signaling device and a panoramic photograph of the area around the valve.

\* \* \* \* \*